Jan. 18, 1966   M. M. RIDDLE   3,229,993
DOOR OPERATED VEHICLE BOARDING STEP
Filed Feb. 13, 1964   2 Sheets-Sheet 1
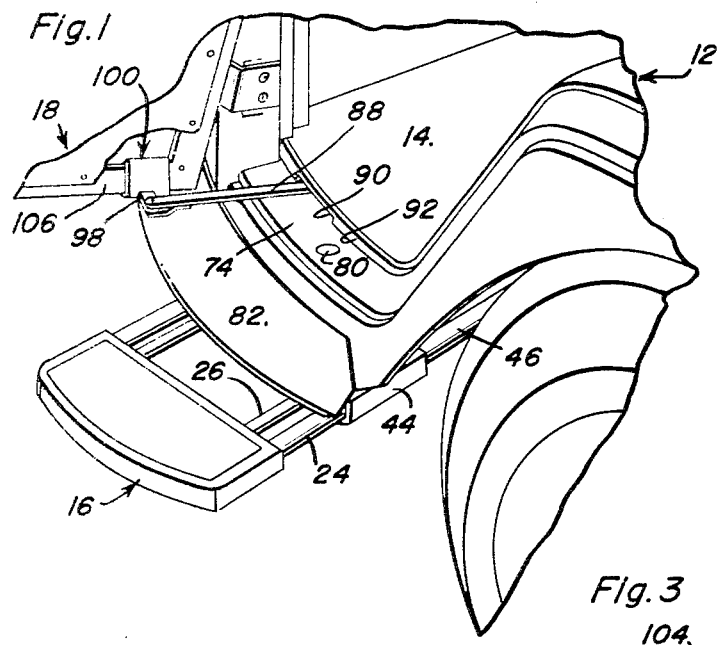
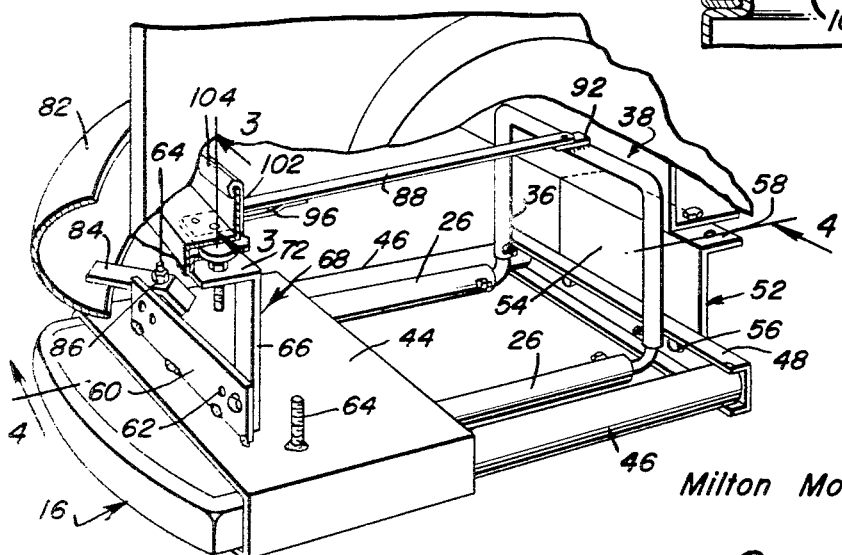
Milton Moss Riddle
INVENTOR.

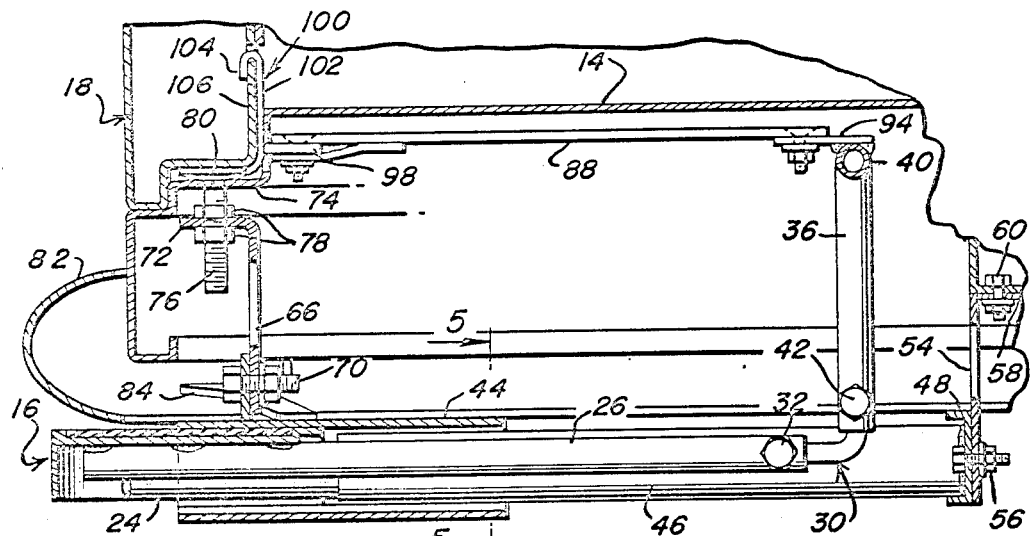
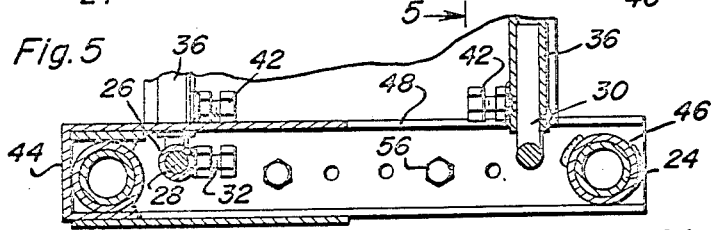
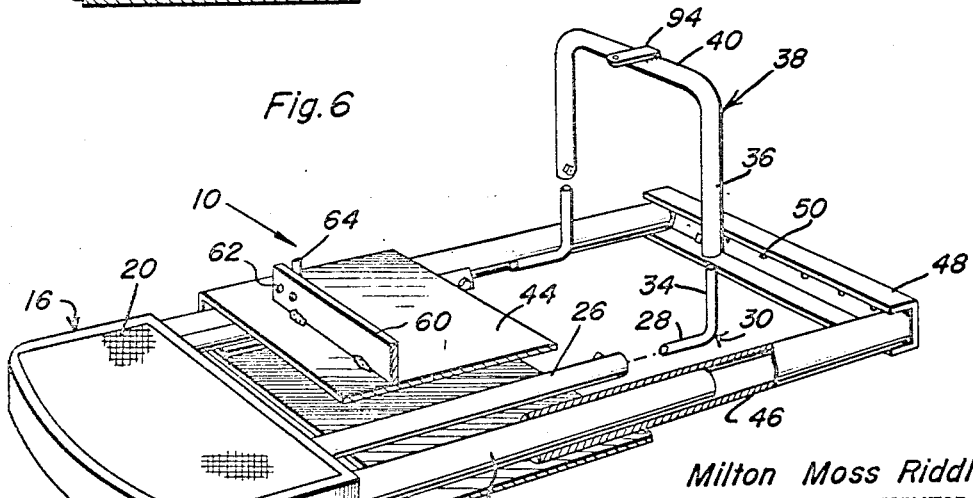
Milton Moss Riddle
INVENTOR.

United States Patent Office 3,229,993
Patented Jan. 18, 1966

3,229,993
DOOR OPERATED VEHICLE BOARDING STEP
Milton Moss Riddle, 100 Hiawatha Drive,
Little Rock, Ark.
Filed Feb. 13, 1964, Ser. No. 344,721
2 Claims. (Cl. 280—166)

The present invention is generally concerned with motor vehicles, and more specifically relates to a device for facilitating entry into specific types of motor vehicles wherein the floor level is normally positioned at a substantial height above ground level, such as for example in various types of trucks and small buses.

While the device of the instant invention is usable with all types of motor vehicles wherein it is desired to provide an intermediate step between the ground and floor of the vehicle, it is intended that the retractable step of the instant invention be primarily utilized in conjunction with a Volkswagen bus or station wagon, or an equivalent vehicle.

It is a significant object of the instant invention to provide for an intermediate vehicle step which is only extended for use when the door to the vehicle is opened, the step automatically retracting upon a closing of the vehicle door.

In conjunction with the above object, it is also an object of the instant invention to provide for a step wherein both the extension and retraction thereof is directly controlled by the opening and closing of the vehicle door.

Likewise, it is an object of the instant invention to provide a device which can be simply and quickly mounted upon any conventional vehicle of the general type referred to above, and which, when installed, prevents a highly stable unit capable of safely accommodating any vehicle passenger.

In addition, it is an object of the instant invention to provide a retractable vehicle boarding step wherein the actual operation of the step is relatively simple so as to insure trouble-free operation of the device.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a partial perspective view illustrating the instant invention mounted in position upon a vehicle;

FIGURE 2 is an enlarged partial perspective view, with portions broken away, illustrating various details of the invention;

FIGURE 3 is an enlarged partial cross-sectional view taken substantially on a plane passing along line 3—3 in FIGURE 2;

FIGURE 4 is an enlarged cross-sectional view taken substantially on a plane passing along line 4—4 in FIGURE 2;

FIGURE 5 is a partial perspective view taken substantially on a plane passing along line 5—5 in FIGURE 4;

FIGURE 6 is a perspective view of the device comprising the instant invention with portions broken away for purposes of illustration.

Referring now more specifically to the drawings, reference numeral 10 is used to generally designate the device or unit comprising the instant invention, this unit 10 being mountable upon a vehicle 12 so as to provide an intermediate step between the ground and the vehicle floor 14 in line with a door opening so as to facilitate entrance into the vehicle.

The unit 10 consists basically of the step 16 itself and the means for mounting the step 16 upon the vehicle for extension and retraction in response to an opening and closing of the vehicle door 18.

The step 16 includes a flat tread 20, provided with a friction surface thereon if so desired, and a depending flange 22 along both the front edge and side edges of the tread 20. A pair of guide arms 24 are rigidly secured to the step 16 and project a substantial distance rearward thereof, these guide arms preferably being tubular in form and secured in spaced parallel relation to each other by welding to both the undersurface of the tread 20 and the opposed side flanges 22. Located slightly inward of each guide arm 24 and extending parallel thereto is a tubular control arm 26 also welded to the undersurface of the tread 20.

Telescopically received within the open rear end of each of the tubular control arms 26 is the horizontal leg 28 of a right angularly bent rod member 30, this horizontal leg being adjustably fixed within the corresponding tube 26 by means of a setscrew 32 extending transversely into the tube 26 adjacent the rear end thereof and clamping the leg 28 therein. The vertical leg 34 of each of the angular rods 30 is telescopically received within the lower end of one of the depending legs 36 of a tubular inverted U-shaped member 38, these legs 36 being interconnected at their upper end by an integral bight portion 40. Also, as will be appreciated, the members 38 is vertically adjustable upon the vertical rod legs 34 and can be locked in any of a plurality of adjusted positions by setscrews 42 threadedly engaged transversely through the lower end portions of the legs 36 for engagement with the rod legs 34.

The means for mounting the step 16 for extension and retraction upon a vehicle 12 consists of an enlarged oblong sleeve or casing 44 of a size so as to receive the step 16 upon a retraction thereof as shall be explained presently. Rigidly welded to the casing or sleeve 44 and extending rearwardly thereof adjacent each side is a pair of parallel guide tubes 46, these guide tubes 46 telescopically receiving the guide arms 24. It will be noted that the forward ends of guide tubes 46 extend only part way into the sleeve 44 and act as a means for limiting the retraction of the step 16 within the sleeve 44. The rear end of the guide tubes 46 are rigidly interconnected by means of a transversely extending forwardly opening channel member 48 having longitudinally spaced bolt holes 50 therealong.

A vertical angle bracket 52 is used to rigidly mount the rear of the device 10, this angle bracket 52 having a vertical leg 54 fixed to the channel member 48 by bolts 56 extending through the vertical legs 54 and selected ones of the holes 50, and a horizontal upper leg 58 secured by bolt 60 to an appropriate part of the vehicle such as for example the dust pan.

In order to mount the forward end of the device 10, a transversely extending vertical plate 60 is welded to the upper surface of the sleeve 44 just rearward of the forward edge thereof, this vertical plate 60 having a pair of aligned bolt holes 62 adjacent each end thereof. Also, a pair of vertically extending threaded studs are welded to the top of the sleeve 44, one spaced slightly outward and rearward of each end of the vertical plate 60. Assuming the unit 10 is to be mounted on the left-hand side of the vehicle 12 as illustrated in the drawings, the lower end of the vertical leg 66 of a front bracket 68 is bolted to the plate 60 by means of a suitable bolt 70 extending through one of the bolt holes 62 extending through the plate 60 adjacent the end of the plate 60 closer to the rear of the vehicle 12. The upper end of the bracket 68 includes a horizontally extending leg 72 which is adjustably locked in position in depending relation from the frame 74 on an elongated threaded rod 76 by upper and lower lock nuts 78. The threaded rod 76 is extended through an aperture in the frame 74 and maintained in position by an integral enlarged head 80 on the rod, this head being flat and lying substantially flush with the upper surface of the frame 74 so as not to interfere with the closing of the door 18.

The device 10 is orientated on the vehicle so as to be in alignment with the door opening. In this position, in many vehicles, especially the Volkswagen bus, the forward front corner of the sleeve 44 is located directly below the vehicle bumper 82 which is wrapped around the front of the vehicle. In order to clamp the sleeve 44 to this bumper 82, an elongated bearing plate 84 is provided, this bearing plate having an aperture through the rear portion thereof through which the threaded stud 64, adjacent the opposite end of the plate 60 to which the bracket 68 is secured, is received. This plate 84 is orientated outwardly into engagement with the lower inner surface of the bumper 82 and tightly engaged thereagainst so as to clamp the inwardly curved edge of the bumper 82 between the plate 84 and the top of the sleeve 44 by means of a suitable nut 86 threaded on the stud 64. If so desired, the plate 84 can have the inner end thereof slightly angled so as to provide for a relatively flat engagement against the inner surface of the bumper 82 thus improving the clamping engagement thereof. In this manner, it will be appreciated that a high degree of stability is introduced into the device 10 inasmuch as the sleeve 44 is clamped directly against a rigid portion of the vehicle.

The extension and retraction of the step 16, responsive to an opening and closing of the door 18, is achieved through an elongated rigid bar or link 88 extending through an elongated slot 90 in the bottom wall 92 of the door frame just below the vehicle floor 14. The inner end of the rigid link 88 is pivotally secured, for rotation about a vertical axis, to a flat plate 94 which is in turn rigidly affixed to the bight 40 of the member 38. The outer end of the rigid link 88 includes a clevis portion 96 which is rotatably secured, for pivoting about a vertical axis, to a projecting ear 98 on the door bracket 100. This door bracket 100 is right angular in shape with the vertical leg 102 including a reversely bent outer end 104. The door bracket 100 is mounted on the lower member 106 of the door frame with the reversely bent end 104 engaged over the upper edge of this lower frame member 106 and with the lower horizontal leg 108 of the door bracket 100 bolted to the undersurface of this door frame member 106 as best seen in FIGURE 3. In this manner, it will be appreciated that as the door is swung inwardly from the open position of FIGURE 1, a force is exerted generally along the length of the link 88, this force being transmitted to the control arms 26 through the member 38 and the angle rods 30, thus causing an inward movement of the step 16 with the guide arms 24 telescoping within the guide tube 46. In addition, inasmuch as the pull is transferred to the step 16 through the control arms 26 which are located parallel to and adjacent the guide arms 24, it will be appreciated that there will be no tendency for the step 16 to move or twist laterally, thus avoiding any possibility of the guide arms 24 jamming within their respective guide tubes 46. Upon opening the door 18, from the closed position of FIGURE 4, it will be appreciated that a pull is exerted on the control link 88, this pull being transmitted to a pushing force on the control arm 26 and a subsequent outward movement of the step 16, the equalization of this push also insuring against any possible jamming of the step.

Inasmuch as two studs 64 are provided, one at each side of the sleeve 44, it will be appreciated that, by merely reversing the above described orientations of the plate 84 and the front bracket 68, the device 10 can be equally applied on the right side of the vehicle. Further, it will be recognized that a high degree of adaptability to different vehicles is achieved through the length and height variations made possible by the telescopic adjustability of the angularly related legs of the angle rods 30, and through the vertical adjustment of the front bracket 68 by means of the threaded rod 76. Likewise, the manner in which the bearing plate 84 can be rotated so as to vary its orientation is also of significance in increasing the adaptability of the instant invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vehicle boarding step extensible in response to the opening of a vehicle door and retractable in response to the closing of a vehicle door, means for mounting said step below and generally parallel to the floor of a vehicle adjacent a door opening, said mounting means including at least one guide passage therein, guide means rigid with said step and slidably received within said guide passage, control means rigid with said step, and a control link having one end thereof pivotally connected to the step control means and the other end thereof adapted to be pivotally secured to the vehicle door so as to translate a swinging movement of the door into a sliding movement of the step, said control means being adjustable both horizontally and vertically, said mounting means including a step receiving sleeve within which the step is positioned upon a retraction thereof, and a pair of said guide passages, said guide passages consisting of a pair of spaced parallel tubes rigid with and extending rearward of said sleeve, the guide means on the step consisting of a pair of elongated rods, one rod telescopically received within each tube, said mounting means further including a vertical extending stud on said sleeve near the forward edge thereof, an elongated bearing plate, said plate having an aperture through one end thereof, said stud being received through said aperture, and means adjustably engaged with said stud above said plate for exerting a downward force on said plate whereby a clamping of a portion of the vehicle between the top of the sleeve and the bearing plate can be achieved.

2. The device of claim 1 wherein said control means consists of two parallel rods, each one of these control rods being located parallel to and adjacent a guide means rod.

References Cited by the Examiner
UNITED STATES PATENTS

| 1,428,030 | 9/1922 | Heaton | 280—166 |
| 2,145,647 | 1/1939 | Evans | 280—166 |
| 2,583,894 | 1/1952 | Shuck | 280—166 |
| 3,164,394 | 1/1965 | Husko et al. | 280—166 |

LEO FRIAGLIA, *Primary Examiner.*